Oct. 28, 1969 D. H. COVILL 3,475,684

INTERROGATING APPARATUS FOR DETERMINING OPTIMUM FREQUENCY FOR RADIO COMMUNICATION

Filed June 16, 1965

3 Sheets-Sheet 3

1

3,475,684

INTERROGATING APPARATUS FOR DETERMINING OPTIMUM FREQUENCY FOR RADIO COMMUNICATION

Dennis H. Covill, Hacketts Cove, Nova Scotia, Canada, assignor to E.M.I.-Cossor Electronics Limited, Dartmouth, Nova Scotia, Canada, a company of Great Britain Filed June 16, 1965, Ser. No. 464,492

Claims priority, application Great Britain, Apr. 20, 1965, 16,674/65

Int. Cl. H04b 1/00

U.S. Cl. 325—67 6 Claims

ABSTRACT OF THE DISCLOSURE

The invention relates to high frequency communication systems incorporating apparatus for determining the optimum carrier frequency. The apparatus for effecting the determination comprises means for transmitting a sequence of interrogating pulses of oscillations, the frequency of the oscillations being arranged to differ for different pulses in the sequence. The receiving station in the system has means for receiving and analysing the interrogating pulse, said means including means for measuring the average amplitude of the output of said receiving means during intervals in each of which one or more of said interrogating pulses of oscillation of a respective frequency should be present, means for measuring the peak value of the output of said receiving means during said intervals, and means for producing for each interval a go-signal if the ratio of said average amplitude to said peak value is greater than a predetermined value and for producing a no-go-signal if said ratio is less than said predetermined value.

Figure 1:
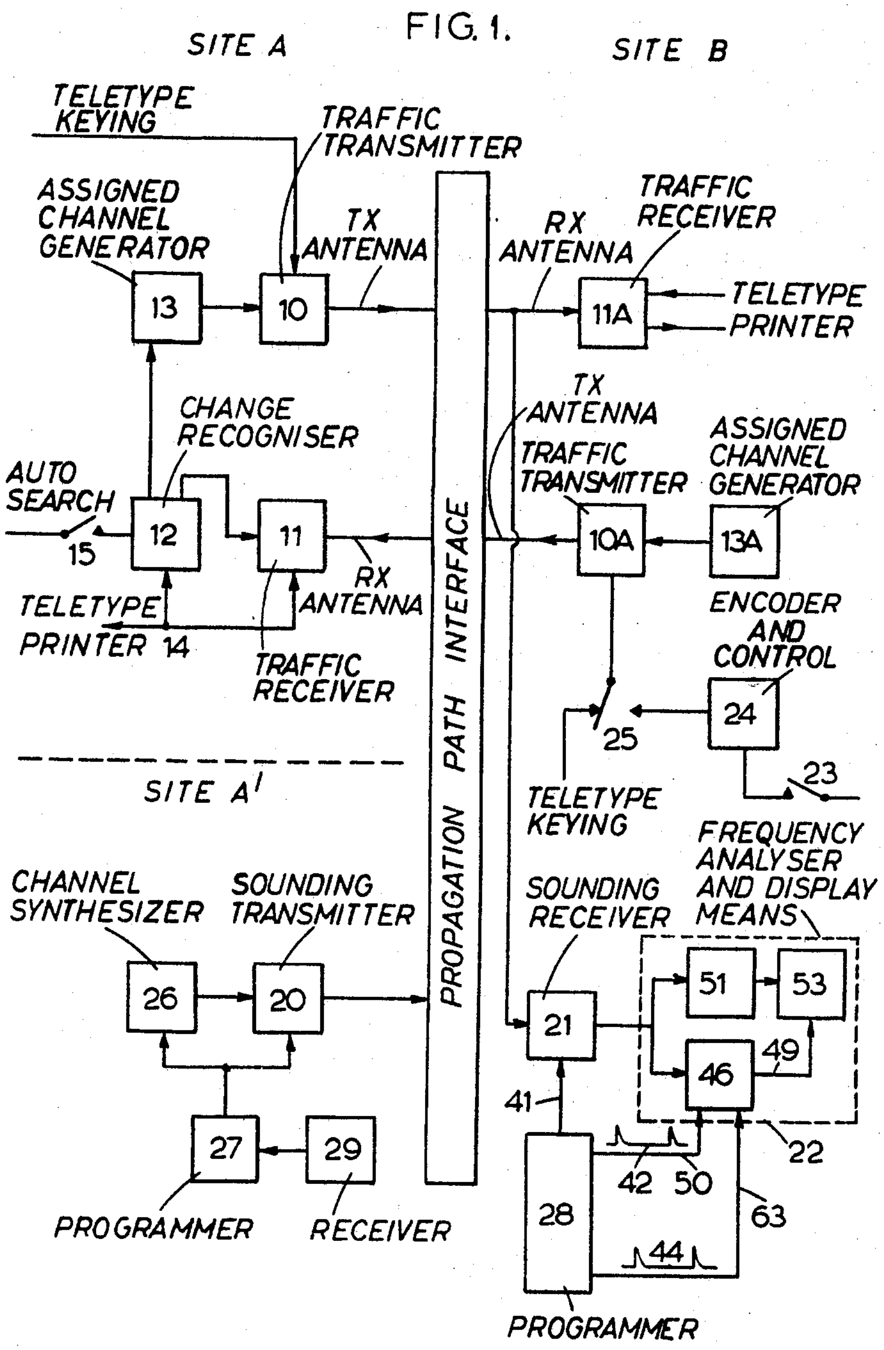

This invention relates to interrogating apparatus for determining the optimum carries frequency for radio communication and relates especially but not exclusively to high frequency communication systems incorporating such apparatus.

High frequency communication systems suffer from failure of the communication systems for a certain percentage of the total time. The failure here referred to is apparent failure of the ionospheric propagation path. Such failure may arise due to absorption and multi-path distortion by the ionized layers above the earth. To reduce such failure, communicators attempt to match the operating frequencies of communication systems to propagation conditions by shifting frequencies according to prediction charts prepared in advance. However such prediction charts are usually incomplete in that they give no detail of the lowest working frequency, multipath conditions or anomalous propagation modes. This last omission is serious in areas where the predominant propagation mode is sporadic E. In addition the use of such charts is of little value in disturbed conditions.

One object of the present invention is to provide improved interrogating apparatus for determining the optimum carrier frequency for radio communication, which is useful for reducing the disadvantage indicated in the preceding paragraph.

According to the present invention there is provided apparatus for determining the optimum carrier frequency for radio communication comprising means for transmitting a sequence of interrogating pulses of oscillation, means for causing the frequency of the oscillations to differ for different pulses in the sequence, means for receiving said pulses at a distant station and means for analysing the received pulses of oscillation of different frequencies, said analysing means including means for

2 measuring the average amplitude of the output of said receiving means during intervals in each of which at least one of said interrogating pulses of oscillation of a respective frequency should be present, means for measuring the peak value of the output of said receiving means during said intervals, means for producing for each interval a first criterion signal if the ratio of said average amplitude to said peak value is greater than a predetermined value and for producing a second criterion signal if said ratio is less than said predetermined value.

The invention is especially applicable to apparatus associated with a high frequency communication system in such a way as to constitute a self-prediction system. A self-prediction system in accordance with the invention comprises a communication system having a plurality of operating channels having suitably distributed frequency bands and means for switching to a particular channel which gives the best communication.

Figure 2:
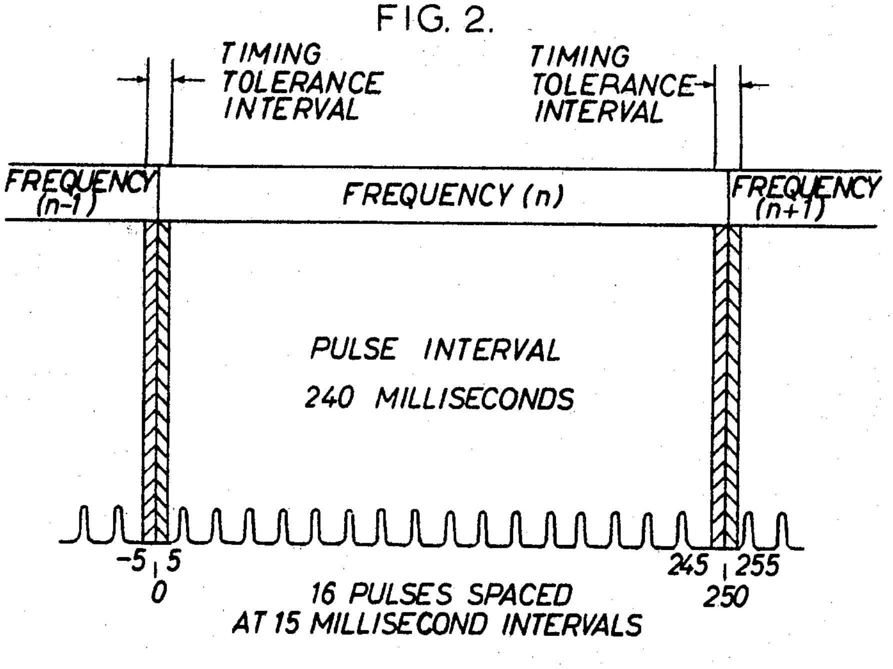
Figure 5:
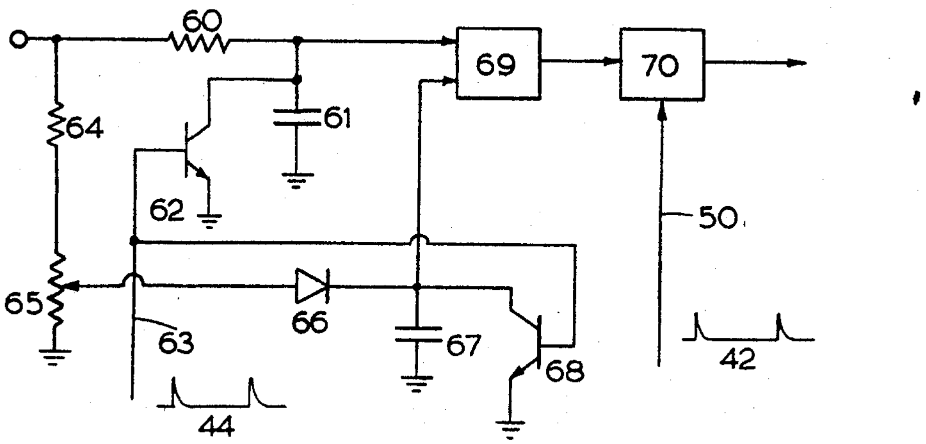
Figure 3:
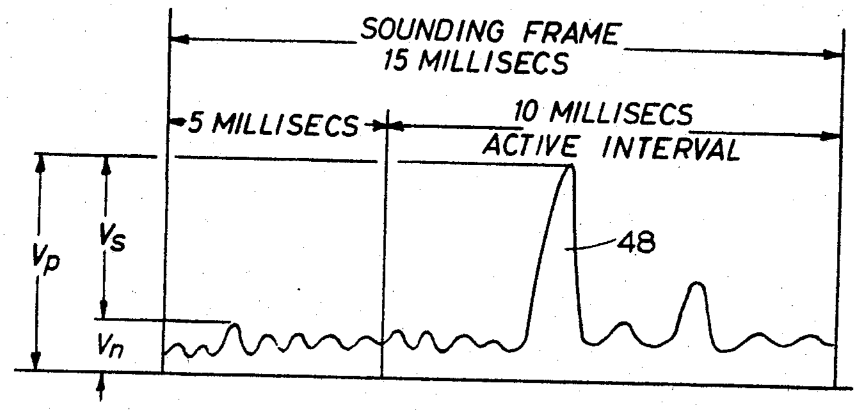
Figure 4:
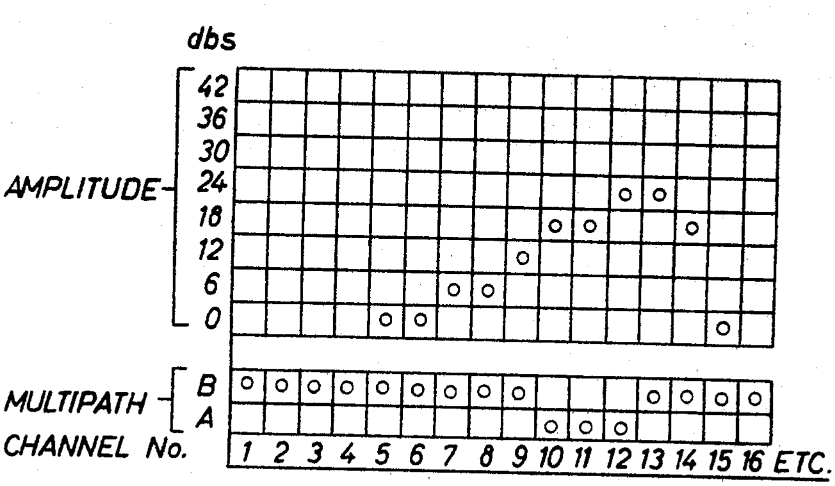

In order that the present invention may be clearly understood and readily carried into effect, it will now be more fully described with reference to the accompanying drawings, in which:

FIGURE 1 illustrates a self-prediction communication system, incorporating interrogating apparatus in accordance with one example of the invention, FIGURE 2 is a diagram illustrating sounding pulses emitted by interrogating apparatus such as illustrated in FIGURE 1, FIGURE 3 is a waveform diagram which will be referred to in describing the operation of the interrogating apparatus according to the invention, FIGURE 4 illustrates the form of display which may be provided in apparatus such as illustrated in other figures of the drawing, and FIGURE 5 illustrates in greater detail part of the frequency analysing and display means incorporated in the interrogating apparatus.

In FIGURE 1 two stations of a communication system located respectively at sites A and B are represented, and interrogating apparatus is associated with the two stations. The communication equipment at site A comprises a traffic transmitter 10. It will be assumed that the signals to be transmitted are applied to the transmitter 10 in the form of Teletype keying signals and that there are sixty four available channels in a four frequency octave band, typically from 2.375 to 38 mc./s., the frequency distribution of the channels being logarithmic. However, it will be understood that the invention is applicable to other systems. Equipment at site A further comprises a traffic receiver 11 connected as shown to a circuit 12 which is a change recognizer and control circuit. The circuit is responsive to appropriately coded signals from the receiver 11 and the output of the circuit 12 is applied to the receiver and to an assigned channel generator 13 as a result of which the transmitting and receiving frequencies of the site A equipment may be automatically changed to the best channel for communication in the conditions then prevailing. The output signals from the traffic receiver are also applied by a lead 14 to a Teletype printer. Control circuit 12 can also be switched for automatic searching by a switch 15. The communication equipment at site B similarly comprises a transmitter 10A, a receiver 11A and an assigned channel generator 13A. It is to be understood that the term "channel" used in connection with this figure includes separate but closely spaced transmit and receive frequencies for a duplex circuit.

The interrogating apparatus associated with the communication equipment comprises an interrogating pulse transmitter, herein called a sounding transmitter 20 located at a site A′. The sites A and A′ are located in the same general area but are indicated separately since the sounding transmitter facility may be required to provide a common facility for all local traffic sites. The signals from the transmitter 20 are propagated from an antenna which may be separate from the antenna of the transmitter 10. At site B the interrogating pulse or sounding receiver 21 receives signals from the same antenna as the receiver 11A. The receiver 21 is a 64 channel receiver, and its output is fed to a frequency analyser and display means denoted generally by the dotted rectangle 22. Reference 23 denotes a switch whereby the operator at site B, depending on the display of the means 22, may select a different channel from the one which has been in use for communication. The representation 23 is intended to denote a plurality of switches whereby any one of a plurality of channels may be selected and an encoder and control circuit 24 is provided which responds to the particular switch which is closed by the operator to produce a signal which changes the frequency of the assigned channel generator 13A to the channel giving best communication at the respective time. The circuit 24 also operates a transmit switch 25 and transmits a coded signal corresponding to the selected channel for a period which may be between 10 and 30 seconds. When the switch is so operated, the transmitter 10A is disconnected from the Teletype keying signals, as indicated on the drawing. It is the signal transmitted from 10A when the switch 25 is thus operated which is recognized by the change recognizer and control circuit at site A. The frequency of the oscillations transmitted by the sounding transmitter 20 is controlled by a channel synthesizer 26, and the synchronization of the operation of the transmitter 20 and synthesizer 26 at site A and of the receiver 21, frequency analyser and synthesizer at site B is effected by a programmer and timing pulse generator 27 at site A and a programmer 28 at site B. The precise instant at which an interrogating sequence commences is determined by synchronising the system against the signal from a standard time signal receiver 29.

The operation of the communication system illustrated in FIGURE 1 is such that periodically, say every 5, 15, 30 or 60 minutes depending upon the time of day or other factor, the sounding transmitter transmits a sequence of interrogating pulses of oscillation the frequency of the oscillations sweeping once through the communication channel frequencies which number 64 in this example in a consecutive sequence of frequency steps. On each frequency step an interrogating pulse or a train of interrogating pulses is radiated. FIGURE 2 illustrates a suitable pulse train which includes sixteen pulses spaced at 15 millisecond intervals, the pulse duration being from 50 to 250 microseconds. The number of pulses radiated on each frequency step may however differ from sixteen being say in the range from one to sixty-four. As aforesaid the precise instant at which the sweep commences is synchronized by the receiver 29. At the same intervals and in synchronism with the transmitter the sounding receiver at site B sweeps through the same band of channels. The sounding receiver is connected to the common receiver antenna of the communication system and detects the transmitted pulses if they pass through the propagation path. The output of the receiver during 64 consecutive time intervals will therefore correspond to signals received at each frequency. During the sweep period the frequency analyser and display means 22 examines each time interval for the appearance of pulses on the receiver output as will be explained subsequently in more detail the pulse or pulses on each frequency step being measured and categorized according to amplitude and possibly other characteristics. The resulting information is displayed in a simple presentation for the station operator. The station operator views this prediction information and decides whether to change the system operating frequencies. If he decides to initiate a frequency change then he presses that one of the buttons represented collectively by 23 corresponding to the desired new channel frequency, at an appropriate time, and initiates the automatic change-over sequence from the encoder and control unit. The encoder and control unit 24 changes the frequency of the local receiver channel, operates transmit switch 25, and transmits the coded change signal corresponding to the new channel number.

At site A, this change signal is received and recognised in the change recognizer and control circuit, and this circuit then automatically changes the site A transmit and receive frequencies to the new channel. At site B, the encoder and control circuit 24, having completed its channel change instruction, releases transmit switch 25, and then changes its own traffic transmitter to the new channel, thus completing the change-over sequence.

It will be realised from the foregoing description that the operator at the interrogating pulse receiving site has control of operating frequencies at both sites. To deal with the situation when communication does not exist between the sites, i.e. during and following a black-out, an automatic search feature is provided in the system. Thus if no communication exists between sites A and B, then site B will continuously transmit the change instruction code corresponding to the latest determination and listen on the corresponding channel. At site A, the operator, having lost communication, closes switch 15 to put the system on "auto search" whereby his receiver will step through the assigned channels in a regular sequence until the change signal is received. At this point the search stops, and the site A operator transmits, on the now established channel, a message that communication is restored.

Referring now in greater detail to the construction of the frequency analysing and display means denoted in general by the dotted rectangle 22 in FIGURE 1, this means includes a recognition circuit 46, a digital processing circuit 51 and a display circuit 53. The coupling from the programmer 28 to the receiver 21 whereby the receiver is switched at the appropriate times to the frequencies of the successive interrogating pulses is denoted by the reference 41, and the programmer 28 is also arranged to generate two sequences of timing pulses, fragments of which are indicated by the references 42 and 44 in FIGURE 1, and which are respectively applied by the couplings 50 and 63 to the recognition circuit 46. The timing of the pulses 42 and 44 will be specified subsequently. The output of the receiver 21 is applied in parallel to the recognition circuit 46 and the digital processing circuit 51 and the output of the latter is in turn applied to the display circuit 53. The operation of the display circuit 53, in response to the output of the digital processing circuit 51, can however be inhibited by a signal applied by the conductor 49 from the recognition circuit 46.

FIGURE 3 shows a typical signal and noise waveform such as might be detected by the receiver 21 corresponding to a pulse frame in an interrogating sweep. If more than one pulse is radiated on each frequency step, the arrangement may be such as to select only one pulse for application to the circuits 46 and 51 and in the following description it will be assumed that FIGURE 3 is representative of the waveform applied to the circuits 46 and 51 for each frequency step, the waveform comprising a pulse 48 corresponding to the respective interrogating pulse from the transmitter, the amplitude of which pulse may be in the range of 0 to 25 volts. The wave also comprises noise and possibly other interference, such as represented. Because of propagation time uncertainty and multi-path propagation modes, the pulse 48 may be received within a time interval of approximately 10 milliseconds, called the active interval, this interval being sufficient to accommodate the overall time tolerances. In an ideal noiseless environment therefore the received interrogating pulse will appear as a 50 to 250 microsecond pulse within the 10 millisecond active interval, and having regard to this the pulses 42 generated by the programmer 28 are, short pulses one of which occurs at the end of the 10 millisecond active interval of each sounding frame. Furthermore, the pulses 44 are short pulses one of which occurs at the beginning of each active interval.

As illustrated in FIGURE 5, the recognition circuit 46 comprises a resistance capacitor integrator comprising the resistor 60 and the capacitor 61. The output of the receiver 21 is applied to the resistor 60, this output being uni-directional in the positive sense. The junction of 60 and 61 is connected to the collector of a transistor 62, of which the emitter is grounded and the base is connected to the lead 63 which carries the pulses 44 occurring at the beginning of the active interval of each pulse frame. The series combination of resistors 64 and 65 is connected in parallel with the integrator 60 and 61, and an adjustable tap in resistor 65 is connected by diode 66 to the junction of a capacitor 67 and the collector of a transistor 68. The emitter of this transistor is grounded and its base is connected to the lead 63 carrying the pulses 44. Each pulse 44 bottoms the transistors 62 and 68 and discharges the capacitors 61 and 67 to approximately ground potential at the beginning of the active interval of the pulse frame. Then during the active interval, the receiver output signal is integrated by the circuit 60, 61 and a proportion of the signal, determined by the setting of the tap on the resistor 65, is peak rectified by the diode 66 and capacitor 67. The tapping on 65 is set to apply to the diode 66 a proportion of the signal applied to the integrator 60, 61, such that if the voltage set up across the capacitor 61 over the 10 millisecond period represents $V_A$ then that across the capacitor 67 represents $V_p/5$. The voltage set up across the capacitor 61 of the integrator is applied to one input terminal of a bistable circuit 69 and the voltage across the capacitor 67 is applied to a second input terminal of that circuit so that the bistable circuit will be in one or other state at any instant depending upon whether the voltage across the capacitor 61 is greater or less than that across the capacitor 67. The state which the circuit 69 assumes when the voltage across the capacitor 61 is greater than that across the capacitor 67 is called the inhibit state. The output of the bistable circuit 69 is applied to an "AND" gate 70 which is periodically enabled by pulses 42 applied by the lead 50 and if the circuit 69 is in the inhibit state when a pulse 42 occurs an inhibit pulse is transmitted to the lead 49 by the gate 70 and thus to the display circuit 53.

It will thus be appreciated that an inhibit pulse will appear on the lead 49 if the ratio $V_p/V_A$ does not exceed 5 at the end of the active interval of the pulse frame.

The digital display may be of any suitable kind but it will be assumed that in this example the circuit 53 operates by the selective illumination of lamps on a panel to give an indication of the peak amplitude of the input to the digital processing circuit 51 on different frequency steps, the circuit 51 being arranged to quantize or digitise the input appropriately. The circuit 53 has 32 channels which can be set manually, depending upon range and time, to receive signals within two octaves of the tuning range of the receiver 21. The display may for example be as indicated in FIGURE 4, the amplitude information being quantized into different amplitude levels as represented. It will however be appreciated that the display is also dependent upon the output signals of the recognition circuit 46 which in turn depends upon the ratio of the peak amplitude $V_p$ to the average amplitude $V_A$ of the signal applied to the circuits 46 and 51 for each frequency step. If the aforesaid ratio does not exceed a predetermined value, namely 5:1 in this example, an inhibiting signal appears on the output lead 49, at the end of the 10 millisecond frame period. If the ratio $V_p/V_A$ is greater than the predetermined value no such inhibiting signal occurs. If the inhibiting signal is present on the lead 49, then the display which is or would otherwise be produced by the display circuit 53 is erased or prevented for that particular frequency, otherwise the display is produced. In this way an acceptance criterion is automatically established which inhibits incorrect decision being made on C.W. or "white noise" signals. It is however, to be understood that the ratio 5:1 for $V_p/V_A$ is not critical and may be varied according to circumstances.

The frequency analysing and display means 22 may include means for measuring other characteristics of received signals, for example it may include means for counting the number of pulses received in a pulse frame exceeding a particular amplitude, thereby to obtain an assessment of the multi-path conditions. The display circuit 53 may then include means for indicating the multi-path conditions by indicating as represented in FIGURE 4, of either (A) that the number of pulses is one, or (B) that the number of pulses is greater than one.

Moreover if more than one pulse is emitted from the sounding transmitter on each frequency step, an alternative to selecting only a single pulse would be to provide means for averaging or integrating the results over all the pulse frames on a single frequency step. In this case, the recognition circuit 46 would again, as in the example described, be arranged to operate only once on each frequency step, the averaging being done directly at the receiver output and prior to signal examination.

The invention is not confined in its application to the type of communication system which is described with reference to FIGURE 1, for example it may be applied to point-mobile systems with appropriate modification in detail. Moreover the components of the arrangement illustrated, the constructions of which have not been specifically referred to, may be of conventional construction. The output signal from the recognition circuit may, furthermore, be used otherwise than to completely inhibit the amplitude display.

What I claim is:

1. Apparatus for determining the optimum carrier frequency for radio communication in a given frequency range, comprising means for transmitting a sequence of interrogating pulses of oscillation, means for causing the frequency of the oscillations to differ for different pulses in the sequence, means for receiving said pulses at a distant station and means for analysing the received pulses of oscillation of different frequencies, said analysing means including means for measuring the average amplitude of the output of said receiving means during intervals in each of which at least one of said interrogating pulses of oscillation of a respective frequency should be present, means for measuring the peak value of the output of said receiving means during said intervals, means determining the ratio of said average amplitude to said peak value and for producing for each interval a first criterion signal if the ratio of said average amplitude to said peak value is greater than a predetermined value and for producing a second criterion signal if said determined ratio is less than said predetermined value.

2. Apparatus according to claim 1 including means for indicating the peak amplitude of pulses received during each interval, and means for applying said criterion signals to said indicating means so that said first criterion signal enables said indicating means and said second criterion signal inhibits said indicating means.

3. Apparatus according to claim 2 including means for changing the frequency of the communication channel in dependence upon switch means operable by an operator observing said indicating means.

4. Apparatus according to claim 1 comprising means for transmitting said sequence of interrogating pulses at periodic intervals.

5. Radio receiving apparatus intended for use in determining the optimum carrier frequency in radio communication within a range of frequencies, comprising means for receiving a sequence of interrogating pulses of oscillation, the reception frequency of said means being systematically variable to allow for the frequency of the oscillation being different for different pulses in the sequence, and means for analysing the received pulses of oscillation of different frequencies, said analysing means including means for measuring the average amplitude of the output of said receiving means during intervals in each of which at least one of said interrogating pulses of oscillation of a respective frequency should be present, means for measuring the peak value of the output of said receiving means during said intervals, means determining the ratio of said average amplitude to said peak value and for producing for each interval a first criterion signal if the ratio of said average amplitude to said peak value is greater than a predetermined value and for producing a second criterion signal if said determined ratio is less than said predetermined value.

6. Apparatus according to claim 5 including means for indicating the peak amplitude of pulses received during each interval, and means for applying said criterion signals to said indicating means so that said first criterion signal enables said indicating means and said second criterion signal inhibits said indicating means.

References Cited

UNITED STATES PATENTS

| | | | |
|---|---|---|---|
| 2,521,696 | 9/1950 | De Armond | 325—51 |
| 3,213,372 | 10/1965 | Kurvitz | 325—478 |
| 3,283,253 | 11/1966 | Ehrich et al. | 325—67 X |
| 3,302,116 | 1/1967 | Free | 325—363 |

ROBERT L. GRIFFIN, Primary Examiner

BENEDICT V. SAFOUREK, Assistant Examiner

U.S. Cl. X.R.

325—56, 322, 323, 325